(12) United States Patent
Pawargi et al.

(10) Patent No.: US 11,613,309 B2
(45) Date of Patent: Mar. 28, 2023

(54) VEHICLE FRAME ASSEMBLY INCLUDING SECONDARY LOAD BEAM TO REDUCE SILL DROP

(71) Applicants: Darshan S Pawargi, Pune (IN); Vikas Vijay Joshi, Pune (IN)

(72) Inventors: Darshan S Pawargi, Pune (IN); Vikas Vijay Joshi, Pune (IN)

(73) Assignee: FCA US LLC, Auburn Hills, MI (US)

( * ) Notice: Subject to any disclaimer, the term of this patent is extended or adjusted under 35 U.S.C. 154(b) by 121 days.

(21) Appl. No.: 17/346,536

(22) Filed: Jun. 14, 2021

(65) Prior Publication Data

US 2022/0396315 A1 Dec. 15, 2022

(51) Int. Cl.
*B62D 21/15* (2006.01)
*B62D 21/02* (2006.01)
*B62D 25/08* (2006.01)

(52) U.S. Cl.
CPC ........... *B62D 21/152* (2013.01); *B62D 25/08* (2013.01); *B62D 21/02* (2013.01)

(58) Field of Classification Search
CPC ....... B62D 21/152; B62D 25/08; B62D 21/02
USPC .................................................. 296/187.09
See application file for complete search history.

(56) References Cited

U.S. PATENT DOCUMENTS

| | | | | |
|---|---|---|---|---|
| 7,556,310 | B2* | 7/2009 | Miki | B62D 25/2018 296/203.02 |
| 8,641,140 | B2* | 2/2014 | Swierczewski | B60N 2/4279 297/216.19 |
| 8,720,976 | B2* | 5/2014 | Oyama | B62D 21/152 296/187.09 |
| 9,452,785 | B2* | 9/2016 | Tsuneyama | B62D 21/157 |
| 9,981,695 | B2* | 5/2018 | Sunohara | B62D 25/2036 |
| 10,071,769 | B2* | 9/2018 | Kim | B62D 21/152 |
| 10,099,725 | B2* | 10/2018 | Ishii | B62D 25/02 |
| 2015/0115633 | A1 | 4/2015 | Braunbeck et al. | |
| 2018/0093710 | A1* | 4/2018 | Kellner | B62D 29/005 |

FOREIGN PATENT DOCUMENTS

| | | |
|---|---|---|
| EP | 1970291 A1 | 9/2008 |
| EP | 2353971 A1 | 8/2011 |
| JP | 2005-231435 A | 9/2005 |
| JP | 4617681 B2 | 1/2011 |
| WO | WO-2011-116019 A2 | 9/2011 |
| WO | WO-2013-172126 A1 | 11/2013 |

\* cited by examiner

*Primary Examiner* — D Glenn Dayoan
*Assistant Examiner* — Dana D Ivey
(74) *Attorney, Agent, or Firm* — Ralph E. Smith

(57) ABSTRACT

A frame assembly for a motor vehicle that may include a first load beam, a second load beam, and a frame rail that are configured for receipt and transfer of energy to a sill that can move the sill in a downward direction. A counterbalancing load beam that includes a first fixed end is attached to the first load beam and a second fixed end is attached to the frame rail. The counterbalancing load beam is configured for receipt of at least a portion of the energy applied to the first load beam, and the counterbalancing load beam is configured to transfer the energy received from the first load beam to the frame rail such that the transfer of energy to the sill that can move the sill in the downward direction is counterbalanced by the energy transferred by the counterbalancing load beam to the frame rail.

17 Claims, 4 Drawing Sheets

VEHICLE FRAME ASSEMBLY INCLUDING SECONDARY LOAD BEAM TO REDUCE SILL DROP

FIELD

The present disclosure relates a vehicle frame assembly including a secondary load beam to reduce sill drop during a frontal impact event.

BACKGROUND

In the event of a frontal vehicle impact, there can be a tendency of the sills (i.e., rocker panels) of the vehicle that support a cabin of the vehicle to move in a downward direction, which is undesirable from the standpoint of passenger safety. Various modifications have been made to vehicle frames to reduce the downward movement of the sills during an impact including adding vertical support members that extend between the upper and lower rail members of the vehicle frame, and adding reinforcement members that increase the stiffness of the sills. These modifications, however, have been found to be insufficient in that these modifications can fail or not reduce the tendency of the sills to move in downward direction after an impact.

SUMMARY

According to a first aspect, the present disclosure provides a front end frame assembly for a motor vehicle. The frame assembly includes a first load beam and a frame rail that are connected to a sill, and each of the first load beam and the frame rail being configured for receipt and transfer of energy to the sill that can move the sill in a downward direction; a second load beam that includes a first fixed end attached to the load beam and a second fixed end attached to the frame rail, the second load beam being configured for receipt of at least a portion of the energy applied to the first load beam, and the second load beam being configured to transfer the energy received form the first load beam to the frame rail such that the transfer of energy to the sill that can move the sill in the downward direction is counterbalanced by the energy transferred by the second load beam to the frame rail, wherein the frame rail includes a lead section located at a front of the frame assembly, an intermediate section, and a trail section connected to sill, the first load beam includes a first section located at the front of the frame assembly, a second section, and a third section connected to either the sill or the trail section of the frame rail, and the first fixed end of the second load beam is attached to the first load beam at a location proximate the first section, and the second fixed end is attached to the intermediate section or the trail section of the frame rail.

According to the first aspect, the lead section and the intermediate section of the frame rail extend in the x-direction defined by a length of the vehicle, and the trail section extends in the x- and z-direction towards the sill.

According to the first aspect, the second fixed end is connected to the intermediate section of the frame rail at a location proximate the trail section.

According to the first aspect, a length of the secondary load beam that is fixed to the frame rail is greater than a length of the secondary load beam that is fixed to the load beam.

According to the first aspect, as the second load beam extends from the first load beam to the frame rail, the first fixed end transitions to a curved neck portion that transitions into an elongated section that extends toward the frame rail, and as the elongated section approaches the frame rail, the elongated section transitions to a bent section that extends along and fixed to the intermediate section of the frame rail, the bent section defining the length of the secondary load beam that is fixed to the frame rail that is greater than the length of the secondary load beam that is fixed to the first load beam.

According to the first aspect, a thickness of the intermediate section of the frame rail is greater than a thickness of each of the lead section and trail section of the frame rail.

According to the first aspect, the frame assembly may include a third load beam that is connected to a hinge pillar that is connected to the sill, the frame rail being positioned between the third load beam and the second load beam.

According to the first aspect, the second load beam is either a solid member or a hollow member.

According to the first aspect, the first load beam includes a first connection arm that connects the first section of the first load beam to the lead section of the frame rail, and a second connection arm that connects the first load beam to the intermediate section of the frame rail.

According to a second aspect of the present disclosure, there is provided a front end frame assembly for a motor vehicle that may include a first load beam, a second load beam, and a frame rail that are connected to a sill, the frame rail being positioned between the first load beam and the second load beam, and each of the first load beam, the second load beam, and the frame rail being configured for receipt and transfer of energy to the sill that can move the sill in a downward direction; and a counterbalancing load beam that includes a first fixed end attached to the first load beam and a second fixed end attached to the frame rail, the counterbalancing load beam being configured for receipt of at least a portion of the energy applied to the first load beam, and the counterbalancing load beam being configured to transfer the energy received form the first load beam to the frame rail such that the transfer of energy to the sill that can move the sill in the downward direction is counterbalanced by the energy transferred by the counterbalancing load beam to the frame rail, wherein the frame rail includes a lead section located at a front of the frame assembly, an intermediate section, and a trail section connected to sill, the first load beam includes a first section located at the front of the frame assembly, a second section, and a third section connected to either the sill or the trail section of the frame rail, and the first fixed end of the counterbalancing load beam is attached to the first load beam at a location proximate the first section, and the second fixed end is attached to the intermediate section or the trail section of the frame rail.

According to the second aspect, the lead section and the intermediate section of the frame rail extend in the x-direction defined by a length of the vehicle, and the trail section extends in the x- and z-direction towards the sill.

According to the second aspect, the second fixed end is connected to the intermediate section of the frame rail at a location proximate the trail section.

According to the second aspect, a length of the counterbalancing load beam that is fixed to the frame rail is greater than a length of the counterbalancing load beam that is fixed to the first load beam.

According to the second aspect, as the counterbalancing load beam extends from the first load beam to the frame rail, the first fixed end transitions to a curved neck portion that transitions into an elongated section that extends toward the frame rail, and as the elongated section approaches the frame rail, the elongated section transitions to a bent section that extends along and fixed to the intermediate section of the frame rail, the bent section defining the length of the counterbalancing load beam that is fixed to the frame rail that is greater than the length of the counterbalancing load beam that is fixed to the first load beam.

According to the second aspect, a thickness of the intermediate section of the frame rail is greater than a thickness of each of the lead section and trail section of the frame rail.

According to the second aspect, the counterbalancing load beam is either a solid member or a hollow member.

According to the second aspect, the first load beam includes a first connection arm that connects the first section of the first load beam to the lead section of the frame rail, and a second connection arm that connects the first load beam to the intermediate section of the frame rail.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Firstly, it should be understood that when an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Secondly, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Thirdly, spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
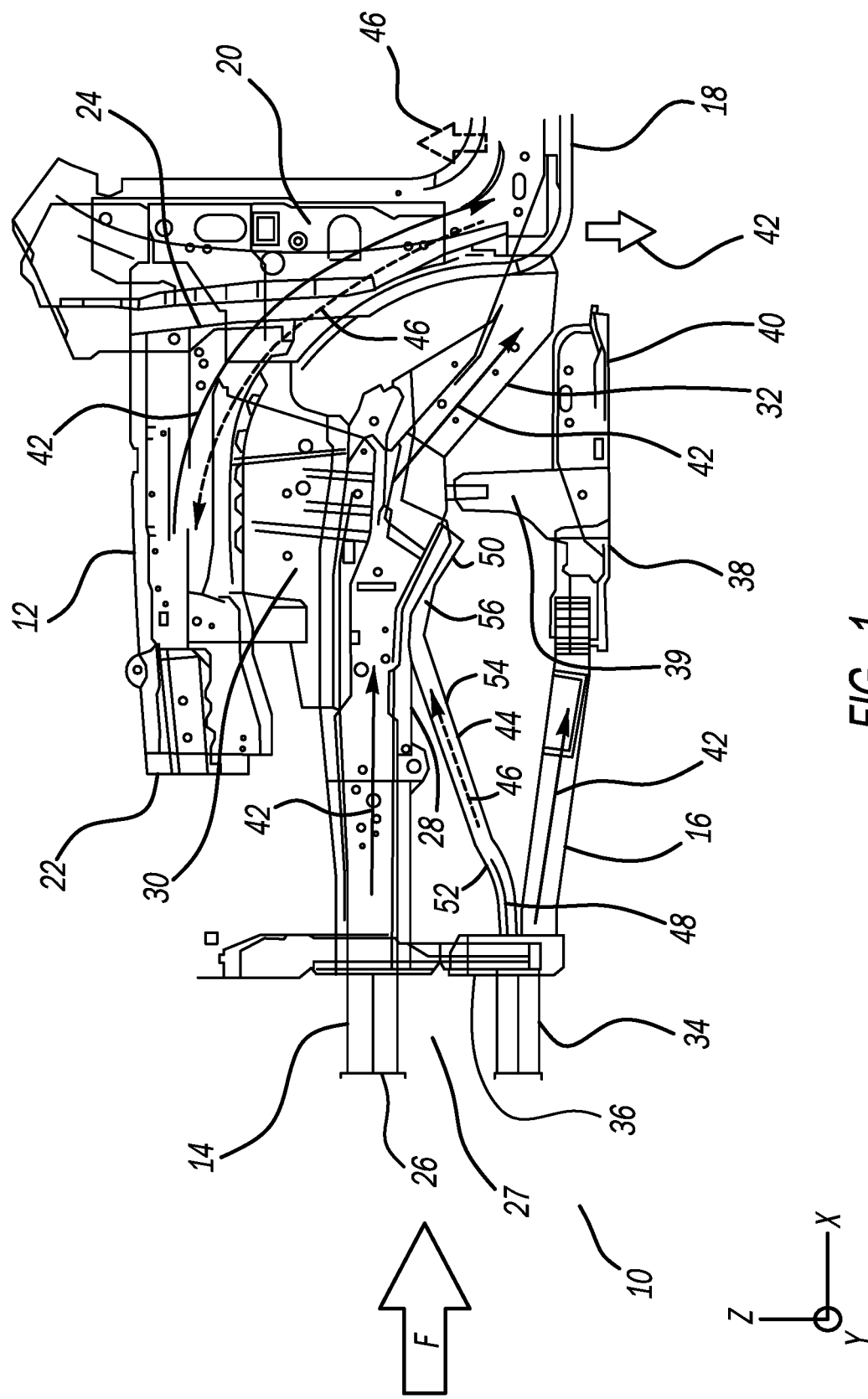
FIG. 1 is a side-perspective view of a front end vehicle frame assembly according to a principle of the present disclosure.

Now description of a vehicle front end frame assembly according to the present disclosure will be described. FIG. 1 illustrates an example vehicle front end frame assembly 10 according to a principle of the present disclosure. In the illustrated embodiment, frame assembly 10 includes an upper load beam 12, a frame rail 14, a lower load beam 16, a sill 18, and a hinge pillar 20. While only a single upper load beam 12, frame rail 14, lower load beam 16, sill 18, and hinge pillar 20 are illustrated, it should be understood that frame assembly 10 includes each of these components on an opposite side of the frame assembly 10 as well. In addition, although not shown in FIG. 1, it should be understood that frame assembly 10 may include cross-beams that extend across a width (i.e., in the y-direction in the figure) of the vehicle that connect the opposite upper load beams 12, frame rails 14, lower load beams 16, sills 18, and hinge pillars 20. In general, each of the components of frame assembly 10 are formed of a rigid metal material such as steel, aluminum, or any other rigid metal or alloy material known to one skilled in the art.

Upper load beam 12 includes a free end 22 and an opposite end 24 that is connected to hinge pillar 20. Frame rail 14 includes a lead section 26 located at the front 27 of the frame assembly 10, an intermediate section 28 attached to upper load beam 12 by a piece of sheet metal 30, and a trail section 32 connected to sill 18. Intermediate section 28 has a thickness that is greater than each of the lead section 26 and tail section 32. Lower load beam 16 includes a first section 34 connected to lead section 26 of frame rail 14 by a first connection arm 36, a second section 38 connected to intermediate section 28 of frame rail 14 by a second connection arm 39, and a third section 40 that may be connected to either trail section 32 of frame rail 14 or to sill 18. First and second connection arms 36 and 39 increase the rigidity of frame assembly 10, but because the connection arms 36 and 39 extend substantially orthogonally relative to lower load beam 16 in a direction (positive Z-direction) toward frame rail 14, do not substantially assist with minimizing the distance that sill 18 will drop (in the negative Z-direction) in the event of an impact to the frame assembly 10.

More specifically, the solid arrows 42 in FIG. 1 illustrate how energy is transferred through frame assembly 10 to sill 18 in the event of a frontal impact the vehicle having a force F. The primary energy absorption structure of frame assembly 10 is frame rail 14. As the energy from the impact is transferred to the frame rail 14, the energy travels from lead section 26, to intermediate section 28, and then from intermediate section 28 to trail section 32. Inasmuch as trail section 32 extends in a downward direction to sill 18, the energy from frame rail 14 can push sill 18 in the downward direction (negative z-direction). Similarly, as energy from the force F is transferred through upper load beam 12 and lower load beam 16, the energy will also be transferred in a direction toward sill 18 that can further cause sill 18 to be pushed in the downward direction. Thus, in order to balance the downward force being applied to sill 18, the frame assembly 10 according to the present disclosure includes a secondary load beam 44 that extends between lower load beam 16 and frame rail 14.

Figure 2:
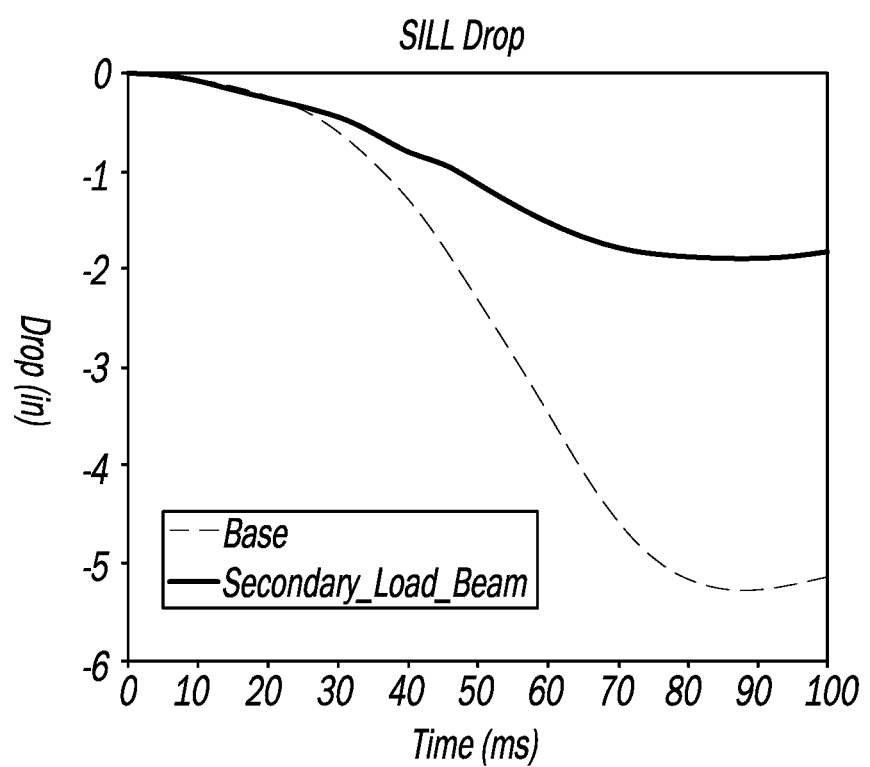
FIG. 2 is a graph illustrating an amount of sill drop that occurs between a frame including a secondary load beam according to a principle of the present disclosure, and a frame that does not include a secondary load beam.

As can be seen by the broken arrows 46, the secondary load beam 44 assists in transferring the energy from the vehicle impact force F in a direction that is opposite to that of the solid arrows 42 to counterbalance the downward force exerted at sill 18 to limit the distance that sill 18 drops during a vehicle impact. By counterbalancing the force exerted against the sill 18, the distance that sill 18 drops during a vehicle impact can be reduced. This is best shown in FIG. 2 where a frame assembly 10 including secondary load beam 44 resulted in a three inch improvement in the distance that sill 18 drops during a vehicle impact in comparison to frame assembly 10 that does not include secondary load beam 44. In other words, while secondary load beam 44 will not completely prevent sill 18 from dropping during a vehicle impact, the secondary load beam 44 will reduce the distance that sill 18 will drop during a vehicle impact which can enable component of the frame assembly 10 like the lower load member 16 and frame rail 14 to more fully absorb energy applied to the frame assembly 10. In addition, the use of secondary load beam 44 can assist in preventing the hinge pillar 20 from being deformed during the collision, which further increases protection of the vehicle occupants by limiting intrusion of the frame assembly 10 into the cabin of the vehicle located behind hinge pillar 20.

Secondary load beam 44 includes a first fixed end 48 attached to lower load beam 16 and an opposite second fixed end 50 attached to frame rail 14. Fixed ends 48 and 50 may be connected to the lower load beam 16 and frame rail 14 by any attachment method known to one skilled in the art including using fasteners such as bolts (not shown), welding, brazing, and the like. Preferably, the secondary load beam 44 is attached to lower lead beam 16 and frame rail 14 by welding to ensure a rigid connection therebetween. Thus, secondary load beam 44 may be formed of the same material as lower load beam 16 and frame rail 14 (i.e., rigid metal materials such as steel, aluminum, or some other type of metal alloy material).

Secondary load beam 44 may be a solid member or formed to be a hollow (e.g., tubular) member. As secondary load beam 44 extends from lower load beam 16 to frame rail 14, the first fixed end 48 transitions to a neck portion 52 that is slightly curved. Neck portion 52 then transitions into an elongated section 54 that extends toward frame rail 14. As elongated section 54 approaches frame rail 14, elongated section 54 transitions to a bent section 56 that extends along intermediate section 28 of frame rail 14. Alternatively, bent section 56 could be connected to trail section 32 of frame rail 14. In either case, the use of bent section 56 ensures that a greater amount of secondary load beam 44 is fixed to frame rail 14 in comparison to first fixed end 48 being fixed to lower lead beam 16. The greater amount of connection between secondary load beam 44 and frame rail 14 ensures that a greater amount of energy is transferred to rail frame 14 in the upward direction during an impact event, which counterbalances the energy being applied to sill 18 in the downward direction via upper load beam 12 and trailing section 32 of frame rail 14.

It should be understood that in order to mitigate dropping of the sill 18 in the event of a vehicle impact, the second fixed end 50 should be connected to either the intermediate section 28 or trail section 32 of frame rail 14. If secondary load beam 44 is not connected to either the intermediate section 28 or trail section 32, the force absorbed and transferred by secondary load beam 44 may not be transmitted to the correct location of frame rail 14 to counterbalance the forces transferred by upper load beam 12, frame rail 14, and lower load beam 16 to reduce the distance which sill 18 may drop.

Figure 3:
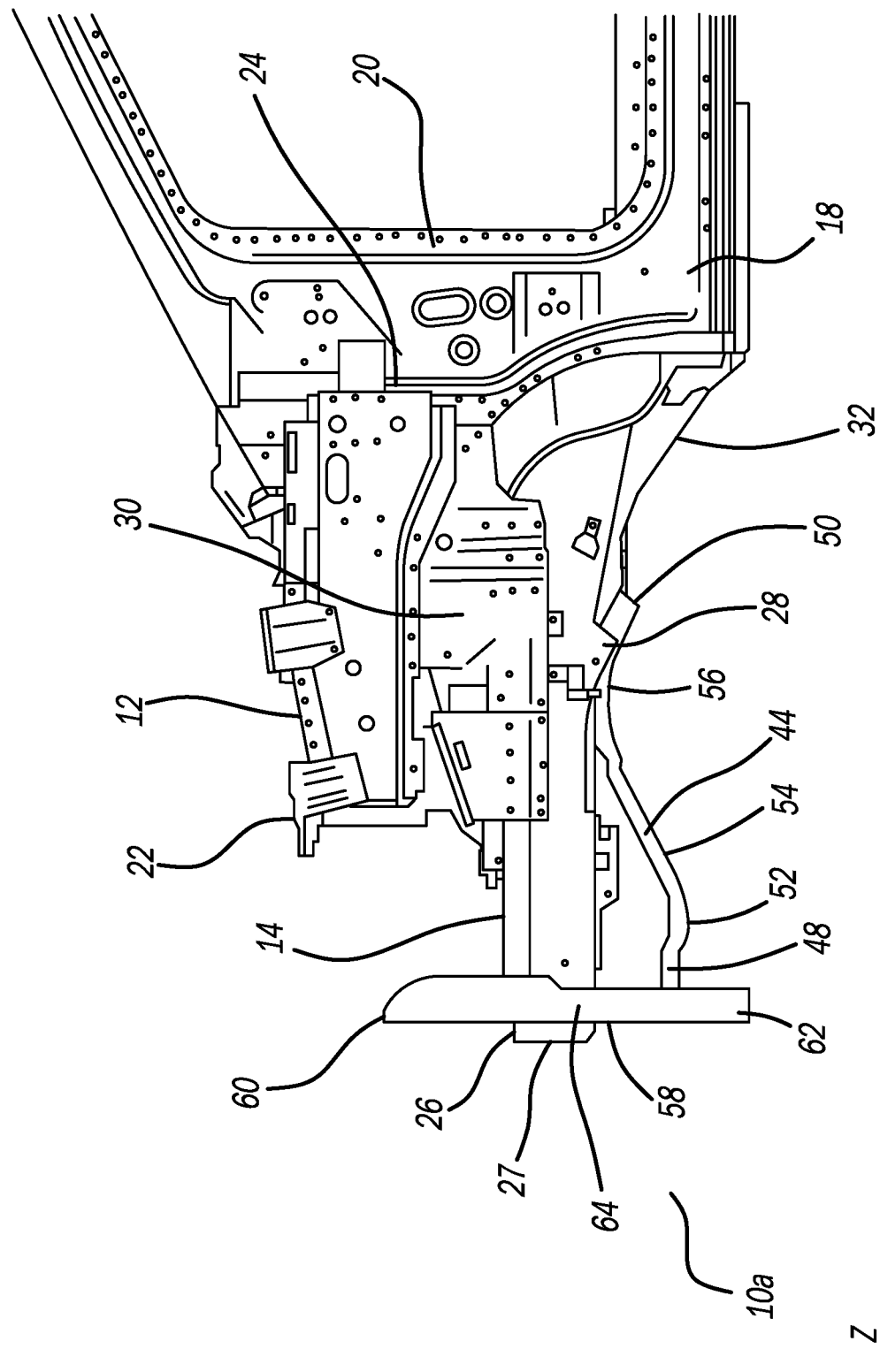
FIG. 3 is a side-perspective view of another front end vehicle frame assembly according to a principle of the present disclosure.
Figure 4:
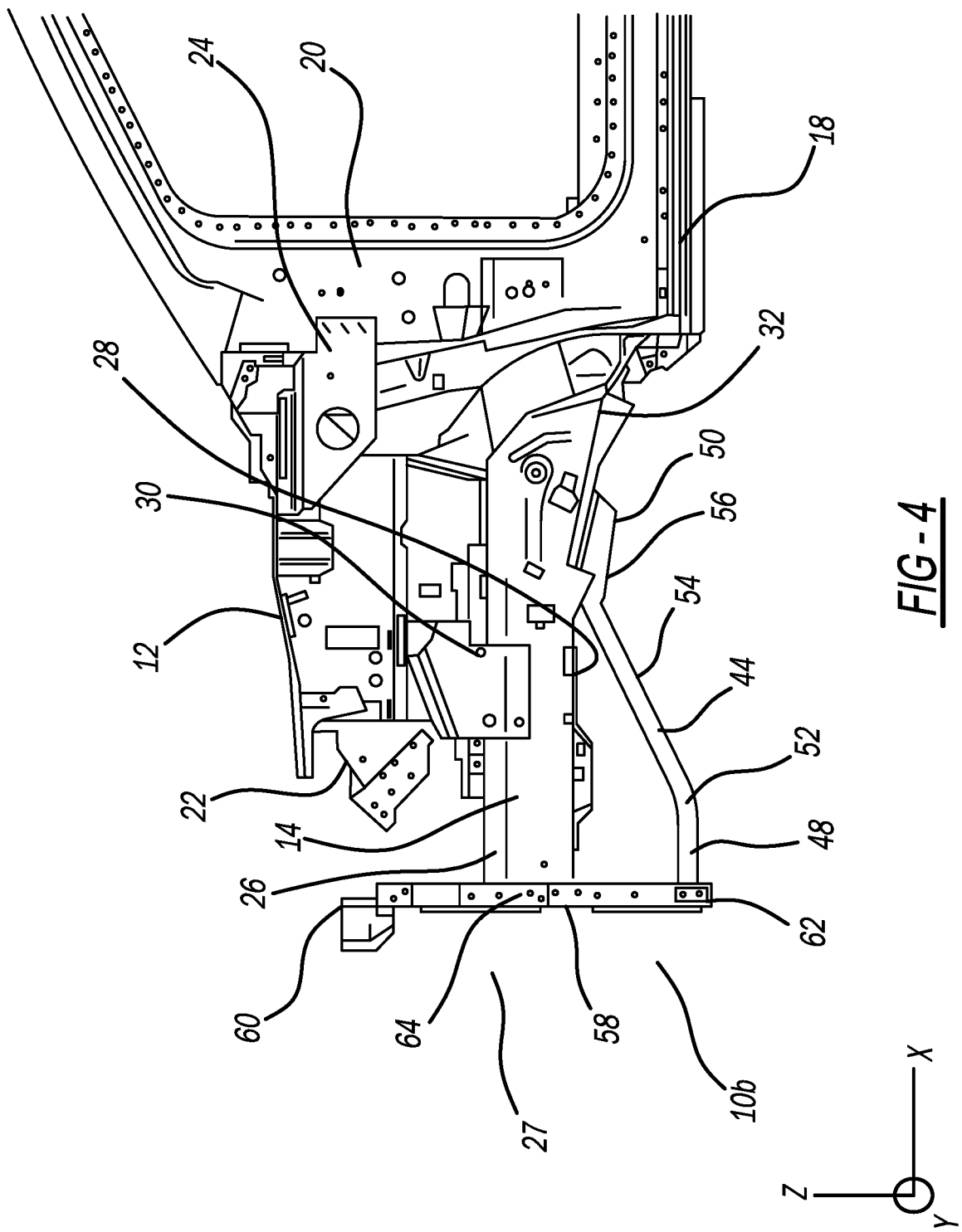
FIG. 4 is a side-perspective view of a front end vehicle frame assembly according to a principle of the present disclosure.

In addition, it should be understood that vehicle frame assembly 10 does not necessarily include lower load beam 16. Referring to FIGS. 3 and 4, frame assemblies 10a and 10b are illustrated that do not include a lower load beam 16. Notwithstanding, each of these frame assemblies 10a, 10b still include a secondary load beam 44. In lieu of attaching first fixed end 48 to a lower load beam, however, frame assemblies 10a, 10b include a pair of vertically extending frame members 58 (of which only one is illustrated in FIGS. 3 and 4) that are configured, for example, to support a radiator or some other type of heat exchanger (not illustrated).

Frame members 58, in the illustrated embodiments, are connected to frame rail 14. Frame members 58 include an upper end 60 and opposite lower end 62, with a central section 64 that extends between upper end 50 and lower end 62 being attached to frame rail 14. Secondary load beam 44 is attached to frame member 58 at lower end 62.

Similar to the first embodiment, secondary load beam 44 may be a solid member or formed to be a hollow (e.g., tubular) member. As secondary load beam 44 extends from lower end 62 to frame rail 14, the first fixed end 48 transitions to a neck portion 52 that is slightly curved. Neck portion 52 then transitions into an elongated section 54 that extends toward frame rail 14. As elongated section 54 approaches frame rail 14, elongated section 54 transitions to a bent section 56 that extends along intermediate section 28 of frame rail 14. Alternatively, bent section 56 could be connected to trail section 32 of frame rail 14. In either case, the use of bent section 56 ensures that a greater amount of secondary load beam 44 is fixed to frame rail 14 in comparison to first fixed end 48 being fixed to lower end 62 of frame member 58. The greater amount of connection between secondary load beam 44 and frame rail 14 ensures that a greater amount of energy is transferred to rail frame 14 in the upward direction during an impact event, which counterbalances the energy being applied to sill 18 in the downward direction via upper load beam 12 and trailing section 32 of frame rail 14.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A front end frame assembly for a motor vehicle, comprising:

a first load beam and a frame rail that are connected to a sill, and each of the first load beam and the frame rail being configured for receipt and transfer of energy to the sill that can move the sill in a downward direction; and a second load beam that includes a first fixed end attached to the load beam and a second fixed end attached to the frame rail, the second load beam being configured for receipt of at least a portion of the energy applied to the first load beam, and the second load beam being configured to transfer the energy received form the first load beam to the frame rail such that the transfer of energy to the sill that can move the sill in the downward direction is counterbalanced by the energy transferred by the second load beam to the frame rail, wherein the frame rail includes a lead section located at a front of the frame assembly, an intermediate section, and a trail section connected to sill, the first load beam includes a first section located at the front of the frame assembly, a second section, and a third section connected to either the sill or the trail section of the frame rail, and the first fixed end of the second load beam is attached to the first load beam at a location proximate the first section, and the second fixed end is attached to the intermediate section or the trail section of the frame rail.

2. The front end frame assembly according to claim 1, wherein the lead section and the intermediate section of the frame rail extend in the x-direction defined by a length of the vehicle, and the trail section extends in the x-and z-direction towards the sill.

3. The front end frame assembly according to claim 2, wherein the second fixed end is connected to the intermediate section of the frame rail at a location proximate the trail section.

4. The front end frame assembly according to claim 2, wherein a length of the secondary load beam that is fixed to the frame rail is greater than a length of the secondary load beam that is fixed to the load beam.

5. The front end frame assembly according to claim 4, wherein as the second load beam extends from the first load beam to the frame rail, the first fixed end transitions to a curved neck portion that transitions into an elongated section that extends toward the frame rail, and as the elongated section approaches the frame rail, the elongated section transitions to a bent section that extends along and fixed to the intermediate section of the frame rail, the bent section defining the length of the secondary load beam that is fixed to the frame rail that is greater than the length of the secondary load beam that is fixed to the first load beam.

6. The front end frame assembly according to claim 1, wherein a thickness of the intermediate section of the frame rail is greater than a thickness of each of the lead section and trail section of the frame rail.

7. The front end frame assembly according to claim 1, further comprising a third load beam that is connected to a hinge pillar that is connected to the sill, the frame rail being positioned between the first load beam and the second load beam.

8. The front end frame assembly according to claim 1, wherein the second load beam is either a solid member or a hollow member.

9. The front end frame assembly according to claim 1, wherein the first load beam includes a first connection arm that connects the first section of the first load beam to the lead section of the frame rail, and a second connection arm that connects the first load beam to the intermediate section of the frame rail.

10. A front end frame assembly for a motor vehicle, comprising:

a first load beam, a second load beam, and a frame rail that are connected to a sill, the frame rail being positioned between the first load beam and the second load beam, and each of the first load beam, the second load beam, and the frame rail being configured for receipt and transfer of energy to the sill that can move the sill in a downward direction; and a counterbalancing load beam that includes a first fixed end attached to the first load beam and a second fixed end attached to the frame rail, the counterbalancing load beam being configured for receipt of at least a portion of the energy applied to the first load beam, and the counterbalancing load beam being configured to transfer the energy received form the first load beam to the frame rail such that the transfer of energy to the sill that can move the sill in the downward direction is counterbalanced by the energy transferred by the counterbalancing load beam to the frame rail, wherein the frame rail includes a lead section located at a front of the frame assembly, an intermediate section, and a trail section connected to sill, the first load beam includes a first section located at the front of the frame assembly, a second section, and a third section connected to either the sill or the trail section of the frame rail, and the first fixed end of the counterbalancing load beam is attached to the first load beam at a location proximate the first section, and the second fixed end is attached to the intermediate section or the trail section of the frame rail.

11. The front end frame assembly according to claim 10, wherein the lead section and the intermediate section of the frame rail extend in the x-direction defined by a length of the vehicle, and the trail section extends in the x- and z-direction towards the sill.

12. The front end frame assembly according to claim 11, wherein the second fixed end is connected to the intermediate section of the frame rail at a location proximate the trail section.

13. The front end frame assembly according to claim 11, wherein a length of the counterbalancing load beam that is fixed to the frame rail is greater than a length of the counterbalancing load beam that is fixed to the first load beam.

14. The front end frame assembly according to claim 13, wherein as the counterbalancing load beam extends from the first load beam to the frame rail, the first fixed end transitions to a curved neck portion that transitions into an elongated section that extends toward the frame rail, and as the elongated section approaches the frame rail, the elongated section transitions to a bent section that extends along and fixed to the intermediate section of the frame rail, the bent section defining the length of the counterbalancing load beam that is fixed to the frame rail that is greater than the length of the counterbalancing load beam that is fixed to the first load beam.

15. The front end frame assembly according to claim 10, wherein a thickness of the intermediate section of the frame rail is greater than a thickness of each of the lead section and trail section of the frame rail.

16. The front end frame assembly according to claim 10, wherein the counterbalancing load beam is either a solid member or a hollow member.

17. The front end frame assembly according to claim 10, wherein the first load beam includes a first connection arm that connects the first section of the first load beam to the lead section of the frame rail, and a second connection arm that connects the first load beam to the intermediate section of the frame rail.

\* \* \* \* \*